US007936250B2

(12) United States Patent
Mermet et al.

(10) Patent No.: US 7,936,250 B2
(45) Date of Patent: May 3, 2011

(54) IDENTIFIER DEVICE AND METHOD OF IDENTIFYING

(75) Inventors: Jean-Francois Mermet, Tourettes-sur-Loup (FR); Bernard Pucci, Cagnes-sur-Mer (FR); Pierre Secondo, Tourettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 12/038,882

(22) Filed: Feb. 28, 2008

(65) Prior Publication Data

US 2008/0218346 A1 Sep. 11, 2008

(30) Foreign Application Priority Data

Mar. 9, 2007 (EP) .................................... 07103871

(51) Int. Cl.

| | |
|---|---|
| ***G06F 7/04*** | (2006.01) |
| ***G09B 21/00*** | (2006.01) |
| ***G06K 19/06*** | (2006.01) |
| ***G06K 7/00*** | (2006.01) |

(52) U.S. Cl. .................... 340/5.8; 340/825.19; 235/490; 235/453; 434/113

(58) Field of Classification Search .......... 235/435–495, 235/375, 385; 434/112–117; 340/825.19, 340/5.8

See application file for complete search history.

(56) References Cited

U.S. PATENT DOCUMENTS

| | | | | |
|---|---|---|---|---|
| 5,577,914 | A * | 11/1996 | Takahashi et al. | 434/113 |
| 5,589,678 | A * | 12/1996 | Atsumi et al. | 235/462.42 |
| 6,502,757 | B1 * | 1/2003 | Iwamoto et al. | 235/494 |
| 7,148,800 | B2 | 12/2006 | Cunningham et al. | |
| 7,358,857 | B1 * | 4/2008 | White | 340/572.8 |
| 2002/0057853 | A1 * | 5/2002 | Usami et al. | 382/312 |
| 2003/0163322 | A1 * | 8/2003 | Nishizawa et al. | 704/271 |
| 2005/0227207 | A1 * | 10/2005 | McAdams et al. | 434/114 |
| 2008/0143296 | A1 * | 6/2008 | Taylor | 320/134 |

FOREIGN PATENT DOCUMENTS

EP 1 625 985 A1 2/2006

* cited by examiner

*Primary Examiner* — Benjamin C Lee
*Assistant Examiner* — Michael Shannon
(74) *Attorney, Agent, or Firm* — Andrea Bauer; Hoffman Warnick LLC

(57) ABSTRACT

An identifier device, which may be part of a tracking or similar transponder device, which can be removably coupled to an article to be identified or tracked. Data representing the identity of the article is encoded in the form of a pattern, and can be read by the identifier device when correctly engaged to the article, by sampling the pattern so as to extract the data encoded therein for transmission. The pattern may be a relief pattern, for example in the form of bumps and pits such as a Braille pattern, or magnetic domains, or the like.

7 Claims, 5 Drawing Sheets

IDENTIFIER DEVICE AND METHOD OF IDENTIFYING

FIELD OF THE INVENTION

The present invention relates to the identification, and optionally the tracking, of articles by means of an identifier device.

BACKGROUND OF THE INVENTION

Freight carriers use removable tracking devices for tracing containers carrying high value goods. The devices are mounted on a container at the origin of the shipment, and unmounted at the destination. Most containers are empty when carried from US or Europe to Asia. To optimize the usage of the devices, they are shipped by air for return to Asia, and to be re-used on a new high value shipment.

The current process for coupling tracking devices and containers, and registration of identification information is manual. A dock worker on a quay or other agent must provide the coupling information, that is, which device number is mounted/coupled with a container number.

Container Numbers are conventionally assigned on the basis of international standards for example as described at http://www.containerhandbuch.de/chb_e/stra/index.html?/chb_e/stra/stra__03__03__00.html.

The container number is made visible on the outside of the container in question. FIG. 1 shows an exemplary container number. The container identification system specified in DIN EN ISO 6346 consists of owner code, consisting of three capital letters 101, the product group code 102, consisting of one of capital letters U, J or Z, a six-digit registration number 103 and a check digit 104.

Correct entry of such numbers into a tracking system calls for education of staff and implies the possibility of incorrect information being transmitted.

In the context of logistics systems for example it is desirable to maintain up to date information concerning the location of articles at any particular time. An important consideration in compiling such information is the identity of each article, which can be used to register the fact that a particular article is at a particular location at a particular time.

U.S. Pat. No. 7,148,800 entitled "Method for associating an asset with a monitoring device" describes one system in this field. In particular the asset can be for example containers that need to be shipped. The method of the patent publication addresses the problem of wrong association of an asset with a monitoring device of the asset. The method comprises connecting a handheld device to the monitoring device by a user and thereafter entering the first information via a keypad on the handheld device. The first information may include a trailer number, the user number, destination code etc., the first information is communicated to a database. The database stores valid second information. The second information includes the valid trailer numbers valid user number valid serial number of monitoring device, etc. At the same time of communication of first information to the database the monitoring device sends a serial number of the monitoring device to the database. The method further comprises comparing the first information and the serial number of the monitoring device, to check the validity of the incoming information in the database. If the incoming information is found to be valid, an association is established between the monitoring device and the trailer. If the incoming information is found to be invalid an error message is sent to the user on the handheld device.

Although this approach may enable the detection of some errors, it cannot rule them out, and may call for still more intensive staff training.

European patent application number EP1625985A1 entitled "A tracking system" meanwhile relates to a method and system for tracking an asset and installation of a tracking system on the asset. The system comprises an enclosure for securing on the asset. The enclosure includes an electrical circuit with a programmable microprocessor. The system further comprises a tracking unit having a tracking device. The tracking unit can be removably mounted within the enclosure. The tracking unit may be connected to the electric circuit of the enclosure using an electrical connection. The micro processor may carry a unique code such that on establishment of the electrical connection the tracking device may identify the enclosure and hence the asset.

SUMMARY OF THE INVENTION

According to the present invention there is provided an identifier device, an article, a unit, and a method of identifying an article.

The present invention enables the identity of an article to be retrieved without the need for a manual entry of the data into a terminal. The identifier device can be recovered and reused without any need for reprogramming or resetting, and with a minimum of manual intervention.

The present invention is compatible with existing registration systems, and equally with existing logistics, stocking and tracking systems.

An absence of electrical contacts in the present invention makes it especially suitable for use in harsh conditions where the presence of dust, dirt or corrosion may render electrical contacts unreliable or inoperable. In particular, shipping containers are often transported by sea where salt water contamination leads to rapid deterioration of unsealed electric devices.

Further features of the present invention will become clear to the skilled person upon examination of the drawings and detailed description.

BRIEF DESCRIPTION OF THE DRAWINGS

Embodiments of the present invention will now be described by way of example with reference to the accompanying drawings in which like references denote similar elements.

FIG. 2, comprising

DETAILED DESCRIPTION OF THE INVENTION

Figure 1:
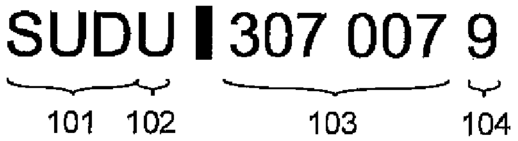
FIG. 1 shows an exemplary container number.
Figure 2A:
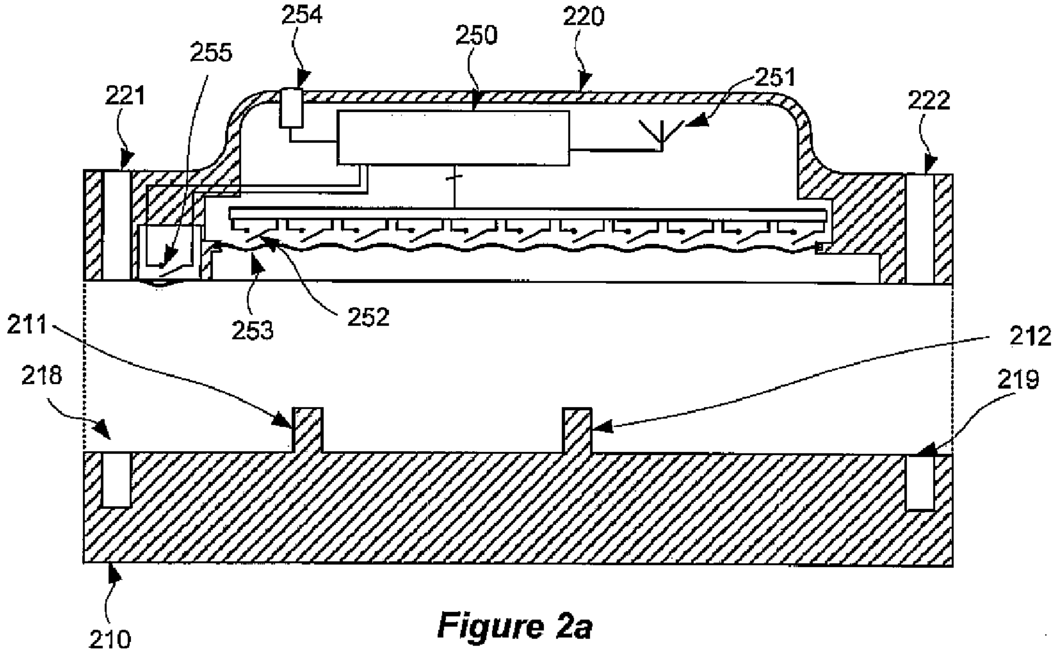
FIGS. 2*a* and 2*b*, shows a first embodiment in cross section.
Figure 2B:
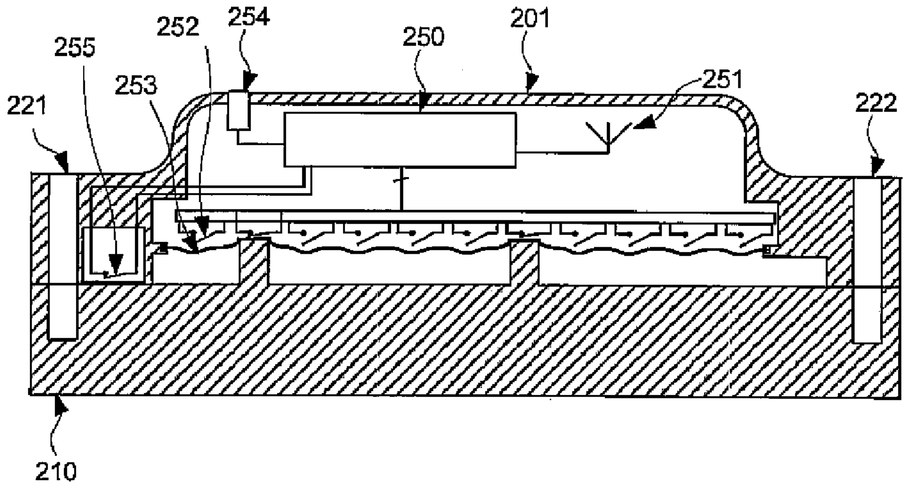

FIG. 2, comprising FIGS. 2*a* and 2*b*, shows a first embodiment in cross-section. As shown, there is provided an identifier device 220 comprising an interface for coupling the identifier device to an article. The interface comprises means 221, 222 adapted to engage an article 210. This article has a surface wherein data representing the identity of the article are encoded in the form of a relief pattern 211, 212 formed on the surface. When the identifier device 220 is correctly engaged to the article 210, means 252 in the identifier device sample the relief pattern 211, 212 so as to extract the data encoded therein. The identifier device further comprises means 251 adapted to transmit the extracted data to a receiver.

In certain embodiments the article is a shipping container, although the skilled person will appreciate that the proposed arrangement may be applied to substantially any article the movements of which it may be desirable to track. Further examples may include vehicles, tools, measuring equipment, animals, etc.

The engagement means may take any of the forms that may readily occur to the skilled person. The engagement may simply involve bringing together two surfaces of complementary form, or it may involve a locking mechanism, for example using spring loaded latches or the like. Such mechanisms may be releasable, for example by incorporating a release lever or the like. The engagement may be secured by means of bolts, screws, rivets or the like. The engagement may involve welding, gluing or clamping the identifier device to the article. The identifier device may comprise passive or electromagnetic means for securing the engagement, for example in a case where the article is ferrous in nature. As shown in FIG. 2*a*, the identifier device is provided with bolt holes 221 and 222 by means of which the identifier device may be releasably secured to the article 210.

The transmitting means 251 may follow any of the various modes of functioning from which the skilled person may select on the basis of the details of any particular usage. For example, the means may involve RFID, Bluetooth, WIFI, ZIGBEE, optical, sonic or any other wired or wireless communication means.

The identifier device may be of any suitable material as will readily occur to the skilled person. In some embodiments, for example where the articles are likely to be exposed to the elements, it may be desirable to use a corrosion resistant material for the casing thereof.

The sampling means 252 comprises an array of switches. There is additionally provided a resilient membrane 253, which may be formed of rubber, plastic or any other suitable material, so as to allow actuation of the switches from the outside whilst maintaining the imperviousness of the casing of the identifier device to the ingress of external agents, such as rain or sea water etc. The sampling means may comprise any means to detect the elevation of the pattern at predetermined points, whether mechanically or otherwise.

The article 210 comprises a place having holes 218, 219 to receive bolts passed through the bolt holes 221 and 222, and two protuberances 211 and 222 which together form a relief pattern. The number and configuration of these protuberances may vary widely. Only two protuberances are shown in FIGS. 2*a* and 2*b*, but in practice it may be expected that the number will be larger. Furthermore, FIGS. 2*a* and 2*b* are in cross section. A practical realization of the embodiment may include protuberances arranged not only in the plane of the page as shown, but also set into or standing out from the page so as to be distributed two dimensionally, The protuberances may have any form—they may be cylindrical, cuboid, etc. Their extremities may be pointed, flat or rounded. They may be distinct form one another, or may wholly or partially merge so as to form contiguous formations. According to certain embodiments the heights of the protuberances may also be varied, thereby introducing a further variable to the encoding scheme. The relief pattern thus formed of such protuberance may come to resemble a three dimensional bar code or a Braille pattern.

In view of the arrangement of the protuberances in the two dimensions belonging to the plane of the surface of the article, the array of switches will correspondingly form a two dimensional array. The switches may thus form a plurality of sensors forming a matrix.

There is further provided a control means 250 for decoding, checking and storing the identification code read by sensors in the identifier device. The identifier device may still further comprise means for storing or processing other information, such as a history of events detected by the identifier means. In this context or otherwise the identifier means may still further comprise a clock means. The identifier device may still further comprise a power source such as an electrical battery, to provide power to the various components of the identifier means. Alternatively the identifier may derive power from an external source, for example through a coupling which may for art of the engagement means by which the identifier device is coupled to the article. The identifier device may also comprise tracking means able to determine the position of the identifier device, for example by means of the GPS or Gallileo systems, a cellular telephony network, or any other positioning technique as may occur to the skilled person. Where such means are provided, the transmitting means 251 may transmit not only the identity of the article with which the identifier device is engaged, but also, its position. As shown, there is provided a switch 255 actuated by the device engaging the article and communicating therewith. Actuation of this switch sends a signal to the control means to initiate sampling of the relief pattern. There is provided an LED or similar visual indicator 254 which may be actuated by the control means 250 in order to provide visual feedback to a user indicating that the identifier device has been properly engaged, or not, that the relief patter has been properly read and decoded, or not, that the identity has been successfully transmitted, or not, and so on.

FIG. 2*b* shows the same elements as FIG. 2*a*, and in particular shows the identifier device 220 and the article 210. In FIG. 2*b*, however, the identifier device 220 and the article 210 have been brought into contact so that the identifier device 220 and the article 210 are engaged together as described above. Specifically, corresponding flat surfaces of the identifier device 220 and the article 210 are in contact with each other, and the bolt holes 221, 222 are aligned with the corresponding holes 218, 219 in the article. Furthermore, it can be seen that the protuberances 211 and 212 have compressed the resilient membrane 251 in the vicinity of two of the switches forming the sensor means 252, and caused these switches to close. This closure of certain switches causes a voltage drop or similar variation which is detectable by the device. The resulting combination of signals is processed to decode the identity of the article, and transmitted as described above via the transmitting means 251.

As discussed above, the identity of the article is encoded in the protuberances that form the relief map measured by the identifier means. The encoding may take a wide range of forms. By way of example, where the identity corresponds to a standard container number as described above, or otherwise where an alphanumeric code is used as the basis of the identification, a binary coded representation may be imagined in which each row of protuberances corresponds to one character, and each column associated with a respective power of two. If the presence of a protuberance is considered to correspond to a binary 1 and the absence of a protuberance to a binary 0, six columns is sufficient to encode $2^6$, or 64 values, which is ample for 26 alphabetic characters and 10 numeric characters. A possible coding on this basis is shown below.

| | $2^0$ | $2^1$ | $2^2$ | $2^3$ | $2^4$ | $2^5$ |
|---|---|---|---|---|---|---|
| 0 | 0 | 0 | 0 | 0 | 0 | 0 |
| 1 | 0 | 0 | 0 | 0 | 0 | 1 |
| 2 | 0 | 0 | 0 | 0 | 1 | 0 |
| 3 | 0 | 0 | 0 | 0 | 1 | 1 |
| 4 | 0 | 0 | 0 | 1 | 0 | 0 |
| 5 | 0 | 0 | 0 | 1 | 0 | 1 |
| 6 | 0 | 0 | 0 | 1 | 1 | 0 |
| 7 | 0 | 0 | 0 | 1 | 1 | 1 |
| 8 | 0 | 0 | 1 | 0 | 0 | 0 |
| 9 | 0 | 0 | 1 | 0 | 0 | 1 |
| A | 0 | 0 | 1 | 0 | 1 | 0 |
| B | 0 | 0 | 1 | 0 | 1 | 1 |
| C | 0 | 0 | 1 | 1 | 0 | 0 |
| D | 0 | 0 | 1 | 1 | 0 | 1 |
| E | 0 | 0 | 1 | 1 | 1 | 0 |
| F | 0 | 0 | 1 | 1 | 1 | 1 |
| G | 0 | 1 | 0 | 0 | 0 | 0 |
| H | 0 | 1 | 0 | 0 | 0 | 1 |
| I | 0 | 1 | 0 | 0 | 1 | 0 |
| J | 0 | 1 | 0 | 0 | 1 | 1 |
| K | 0 | 1 | 0 | 1 | 0 | 0 |
| L | 0 | 1 | 0 | 1 | 0 | 1 |
| M | 0 | 1 | 0 | 1 | 1 | 0 |
| N | 0 | 1 | 0 | 1 | 1 | 1 |
| O | 0 | 1 | 1 | 0 | 0 | 0 |
| P | 0 | 1 | 1 | 0 | 0 | 1 |
| Q | 0 | 1 | 1 | 0 | 1 | 0 |
| R | 0 | 1 | 1 | 0 | 1 | 1 |
| S | 0 | 1 | 1 | 1 | 0 | 0 |
| T | 0 | 1 | 1 | 1 | 0 | 1 |
| U | 0 | 1 | 1 | 1 | 1 | 0 |
| V | 0 | 1 | 1 | 1 | 1 | 1 |
| W | 1 | 0 | 0 | 0 | 0 | 0 |
| X | 1 | 0 | 0 | 0 | 0 | 1 |
| Y | 1 | 0 | 0 | 0 | 1 | 0 |
| Z | 1 | 0 | 0 | 0 | 1 | 1 |

So for example the character "S" would be encoded 001110, which would in turn be physically encoded in the relief pattern as "gap, gap, bump, bump, bump, gap".

Many other such coding techniques may be envisaged, for example with more or less bits per character, or based on encoding several characters at a time. The Braille system provides an established encoding system which is also based on six bit coding, although the bits are conventionally arranged in 2 by 3 tuples rather than 1 by 6 rows as described above.

Figure 3:
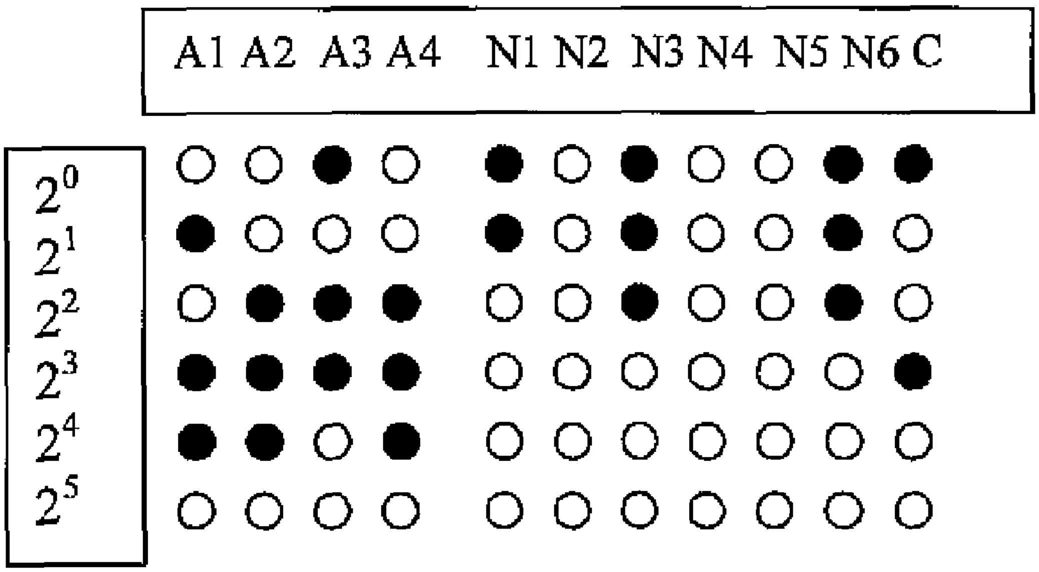
FIG. 3 shows a plan view of a relief pattern encoding the container number "SUDU 3070079."

FIG. 3 shows a plan view of a relief pattern encoding the container number "SUDU 3070079". The relief pattern is in the form of a grid or matrix. A protuberance is shown by a filled circle, and a gap is shown by an empty circle. The matrix has 11 columns corresponding to the 11 characters of the container number "SUDU 3070079", and 6 rows, corresponding to the six powers of 2 necessary to encode the 36 possible characters needed for conventional characters. As shown, there is a slight extra gap between the first four columns and the remaining columns separating the numbers from the characters. This is by no means essential, but may assist humans in visually decoding the relief pattern, and enabling the identifier device to automatically detect incorrect alignment with respect to the relief pattern.

The encoded data may include a wide variety of information in addition to the identity of the article. For example, the data may include error detection or correction information, information descriptive of the article, information relating to requirements of the article with respect to storage or handling conditions, etc. The number and configuration of the protuberances may be modified so as to provide the required storage capacity.

Figure 4:
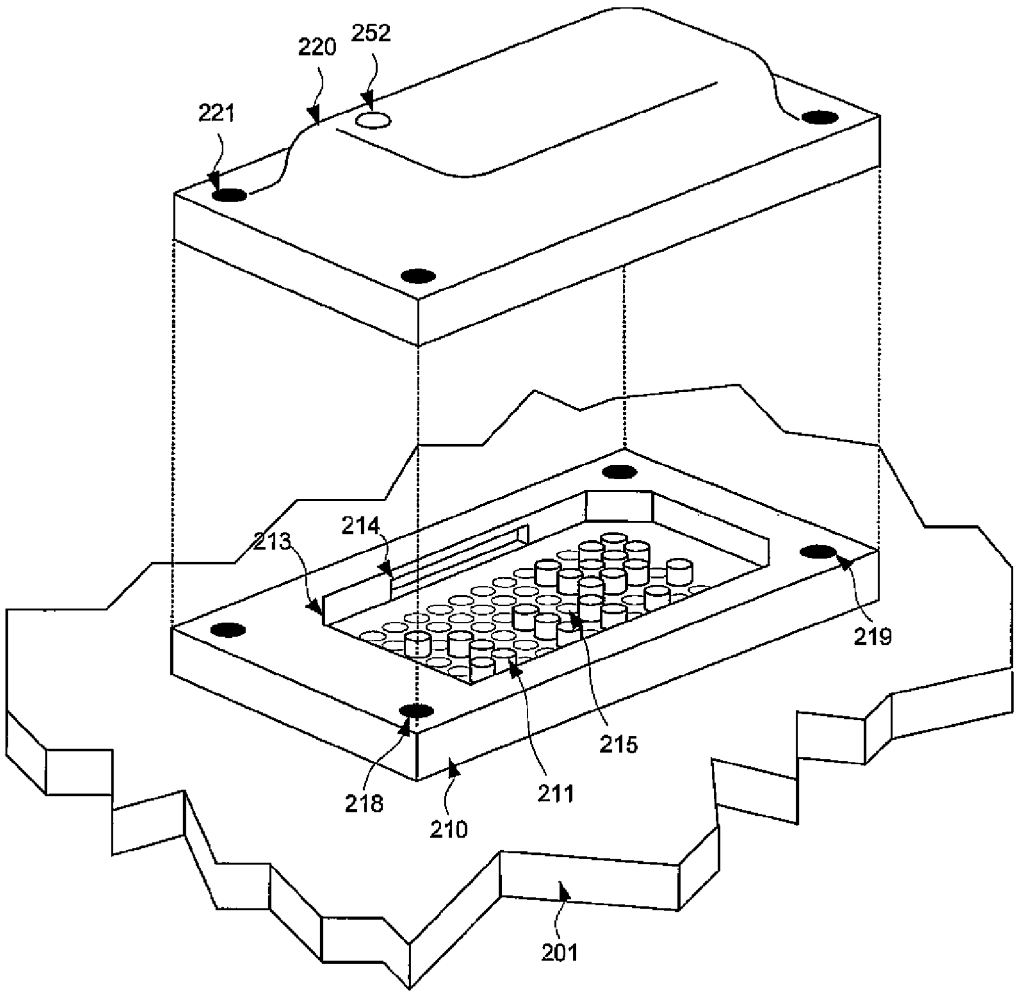
FIG. 4 show a combination of features from the embodiments described with respect to FIGS. 2 and 3.

FIG. 4 shows a combination of features from the embodiments described with respect to FIGS. 2 and 3. In particular FIG. 4 shows an isometric view of the article 210 and the identifier device 220. As shown, the article 210 has an extensive surface 201 on which is formed the smaller area comprising the relief pattern wherein data representing the identity of the article, for example as described above are encoded in the form of a relief pattern formed on the surface, and means 218 and 219 adapted to engage the identifier device. Further, such engaging means are shown in the form of the recess 214, which may be provided to engage a spring loaded clip or the like. FIG. 4 shows 23 protuberances 211 which together encode the container number "SUDU 3070079" as described with respect to FIG. 3.

The present invention has been described in terms of a relief pattern formed of protuberances. It will be appreciated that other methods of encoding by means of a two dimensional pattern may be envisaged. The number of possible heights for the protuberances forming the relief patter need not be limited to two, but may have any number of predetermined values within the limits of the range that can be accurately detected by the sensors. Such methods may relate to assigning encoded values to particular positions on a two dimensional plane. Such methods can be non-electrical, that is, not calling for an electrical contact between the article and the identifier device. Such methods can be digital (e.g., binary), whereby there is a predetermined set of allowable values that may be assigned to any position in the two dimensional plane. Examples include magnetic or optical arrangements, for example replacing the bumps and gaps of the above described examples with areas exhibiting one or another of particular magnetic polarizations or alignments, or similarly with areas exhibiting one or another of particular optical properties such as coloration, polarization or reflectivity. Any of the variation described herein in the context of relief pattern embodiments may be adapted to such a magnetic or optical approach. Still further, a combination of such means of encoding may be employed to form a single complex pattern.

The transmission of data from the identifier device may take place at any moment, from the time at which the identifier device engages the article and reads the data encoded thereon, onwards. For example, the identifier device may periodically transmit data, or at predetermined times, or in result to external stimuli such as a radio or other interrogation, or triggered by the state of another device or instrument forming part of the identifier. The device determining that it is within a particular geographic location etc. The device may also be triggered to transmit data by its removal from the article, for example as detected by a change in the signal from the switch 255 as described above.

According to further embodiments there is disclosed an identifier device, which may be part of a tracking or similar transponder device, which can be removably coupled to an article to be identified and/or tracked, wherein data representing the identity of the article are encoded in the form of a pattern formed, and can be read by the identifier device when correctly engaged to the article, by sampling the pattern so as to extract the data encoded therein for transmission. The pattern may be a relief pattern for example in the form of bumps and pits such as a Braille pattern, or magnetic domains, or the like.

Figure 5:
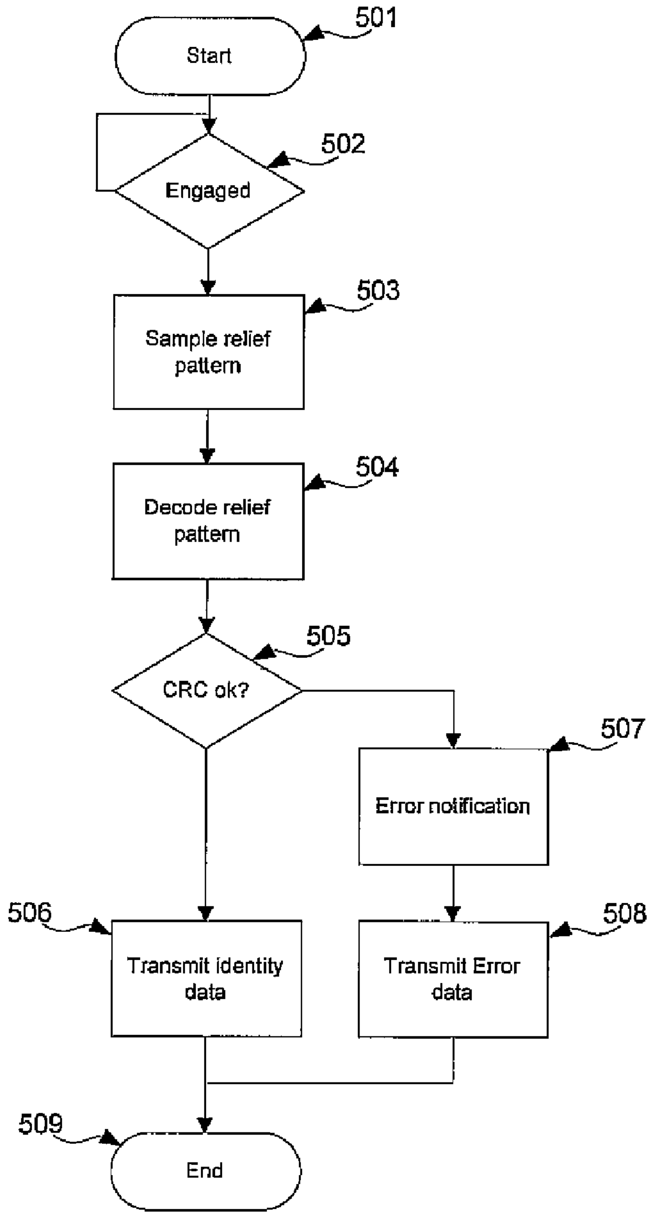
FIG. 5 shows the steps that may take place prior to and during engagement of the identifier device to an article.

FIG. 5 shows a process that may take place prior to and during engagement of the identifier device to an article. The method begins at 501, and proceeds to 502 at which it is determined whether the identifier device is engaged with an article or not, for example by reference to the signal from the switch 255 or more generally to the sensor means 252. If it is determined that the identifier device is not yet engaged, the method repeats 502. If it is determined that the identifier device is now engaged, the method proceeds to 503, at which signals are retrieved from the sampling means 252, and are then decoded, e.g., by the control means 250 as discussed heretofore. At 504, a check of the validity of the decoded data may be carried out, for example on the basis of a cyclic redundancy check. If it is determined that the decoded data is valid, the method proceeds to 506, at which the data is transmitted, for example by means of the transmitter means 251. Where it is determined that the data is invalid, the method proceeds to 507 at which an error notification is issued, for example by means of the indicator 254, a buzzer, or other such notification. Information may also be transmitted wirelessly by the transmitter means 251 as shown at 508 which follows step 507. After either 506 or 508 the method terminates at 509. Numerous variations of this process will occur to the skilled person, for example in returning to 502 after 508, so that in the case of an error condition the user may re engage the identifier device in case the error is due to a foreign particle, incorrect alignment, etc.

Figure 6:
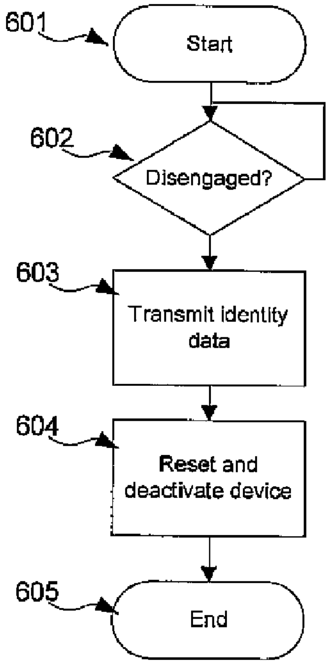
FIG. 6 shows the steps that may take place upon disengagement of the identifier device from an article.

FIG. 6 shows a process that may take place upon disengagement of the identifier device from an article. The method starts at 601, and proceeds to 602 at which it is determined whether the identifier device has been disengaged from the article or not, for example by reference to the signal from the switch 255 or more generally to the sensor means 252. If it is determined that the identifier device is still engaged the method repeats 602. If on the other hand it is determined that the identifier device has in fact been disengaged, the method proceeds to 603, at which the identity data and any other data are transmitted, for example by means of the transmitter means 251. The method next resets and deactivates the device at 604 before terminating at 605.

It will be appreciated that the processes described above with respect to FIGS. 5 and 6 may be combined.

Figure 7:
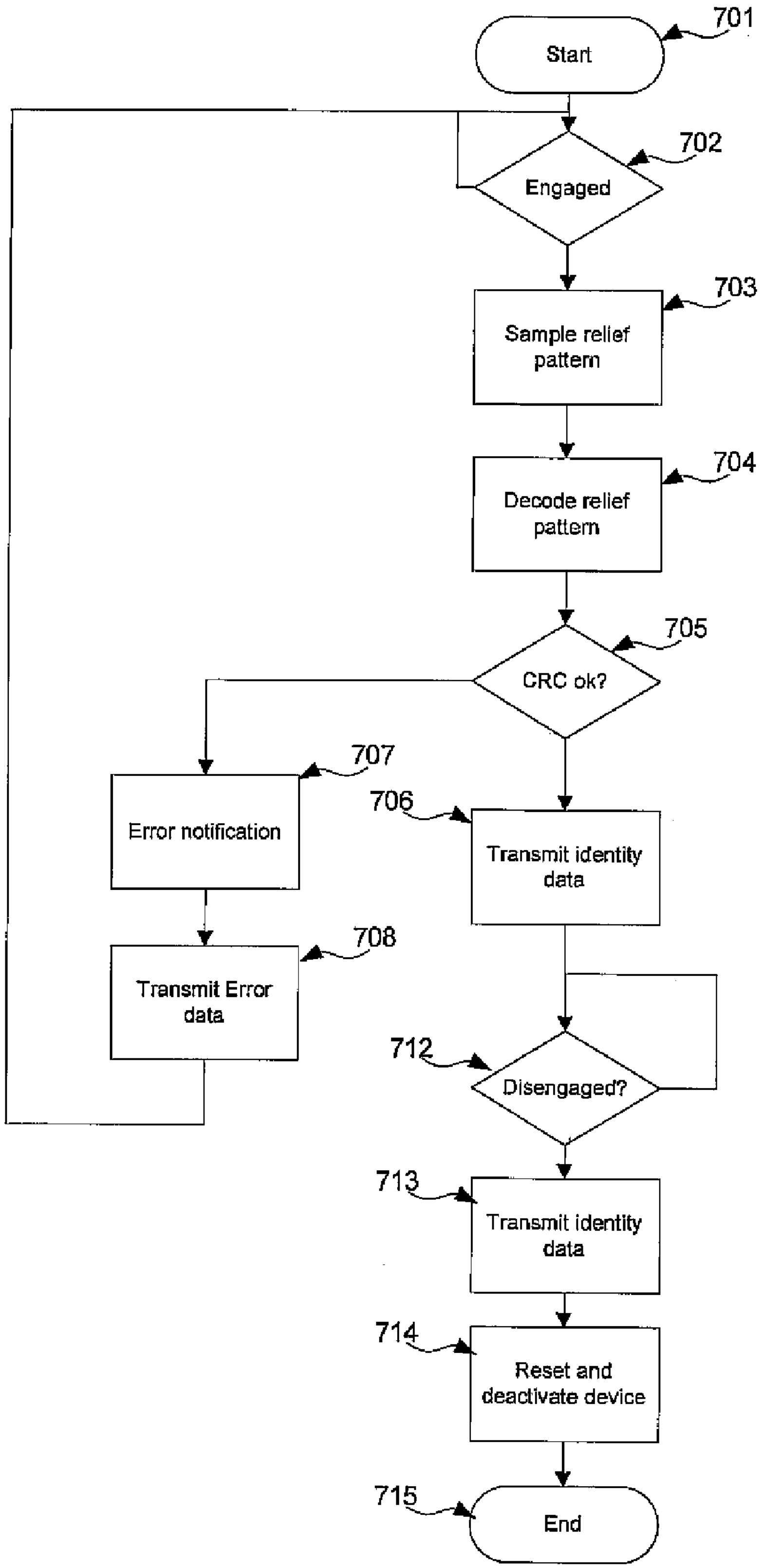
FIG. 7 shows the steps of FIGS. 5 and 6 combined as a single series.

FIG. 7 shows the processes of FIGS. 5 and 6 combined as a single series, where 701, 702, 703, 704, 705, 706, 707 and 708 correspond to 501, 502, 503, 504, 505, 506, 507 and 508, and 712, 713, 714 and 715 correspond to 602, 603, 604 and 605, respectively, with 712 following on from 706, and 708 returning to 702.

Control of these processes can be carried out under the control of the control means 250, so that the invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the preferred embodiments of this invention has been presented for purposes of illustration and description. It is not intended to be exhaustive or to limit the invention to the precise form disclosed, and many modifications and variations are possible.

The invention claimed is:

1. An identifier device for identifying an article having a surface wherein data representing an identity of the article is encoded in a form of a relief pattern formed thereon, the relief pattern including a plurality of protuberances for encoding the data, the device comprising:

- an interface for coupling to the article, the interface comprising:
  - an engagement system for attaching a surface of a casing of the identifier device to a complementary surface of the article; and
  - a sampling system for sampling the relief pattern to extract the data representing the identity of the article upon correct engagement by the engagement system, the sampling system comprising a plurality of switches configured to physically engage the plurality of protuberances of the relief pattern;
- a processing system for processing the extracted data and for transmitting the processed data to an external receiver;
- a switch for actuating the sampling system upon attachment of the identifier device to the article;
- a visual indicator, coupled to the processing system, for providing visual feedback regarding at least one of proper attachment of the identifier device to the article, proper sampling of the relief pattern, and successful transmission of the processed data to the external receiver; and
- a resilient member for sealing the sampling system, the processing system, the actuating switch, and the visual indicator within the casing of the identifier device, wherein the resilient member is compressed by the relief pattern against respective switches of the sampling system upon attachment of the identifier device to the article.

2. The identifier device of claim 1, wherein the relief pattern comprises a three dimensional bar code or a Braille pattern.

3. The identifier device of claim 1, wherein the engagement system for attaching to the article is adapted to releasably attach to the article.

4. The identifier device of claim 1, wherein the plurality of switches of the sampling system for sampling the relief pattern comprises a matrix of switches.

5. The identifier device of claim 1, further comprising:

a system for decoding, checking, or storing the data extracted by the sampling system.

6. The identifier device of claim 1, further comprising:

a system for determining a position of the identifier device.

7. The identifier device of claim 1, wherein the article is a shipping container.

* * * * *